US011089050B1

(12) United States Patent
Horman et al.

(10) Patent No.: US 11,089,050 B1
(45) Date of Patent: Aug. 10, 2021

(54) ISOLATING AN IFRAME OF A WEBPAGE

(71) Applicant: CA, Inc., New York, NY (US)

(72) Inventors: Yoav Horman, Tel Aviv-Jaffa (IL); Roee Kasher, Tel Aviv-Jaffa (IL); Tal Solomon, Tel Aviv (IL)

(73) Assignee: CA, Inc., San Jose, CA (US)

( * ) Notice: Subject to any disclaimer, the term of this patent is extended or adjusted under 35 U.S.C. 154(b) by 176 days.

(21) Appl. No.: 16/551,440

(22) Filed: Aug. 26, 2019

(51) Int. Cl.
*H04L 29/06* (2006.01)
*H04L 29/08* (2006.01)
*G06F 16/958* (2019.01)
*G06F 21/56* (2013.01)
*G06F 21/12* (2013.01)
*G06F 16/951* (2019.01)

(52) U.S. Cl.
CPC .......... *H04L 63/145* (2013.01); *G06F 16/951* (2019.01); *G06F 16/958* (2019.01); *G06F 16/972* (2019.01); *G06F 21/128* (2013.01); *G06F 21/563* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 7,430,712 B2 * | 9/2008 | Arokiaswamy | ....... | G06F 16/972 715/234 |
| 8,209,706 B2 * | 6/2012 | Corvera | ..................... | G06F 9/54 719/315 |
| 8,407,665 B1 * | 3/2013 | Eddings | ................ | G06F 16/958 717/106 |
| 9,311,280 B2 * | 4/2016 | Devara | .................. | G06F 9/5044 |
| 9,323,730 B2 * | 4/2016 | Halevi | .................. | G06F 16/954 |
| 9,398,017 B1 * | 7/2016 | Nizametdinov | ........ | H04L 63/10 |
| 9,491,061 B1 * | 11/2016 | Nizametdinov | ........ | H04L 63/08 |
| 10,452,868 B1 * | 10/2019 | Sundberg | ............ | G06F 21/6245 |
| 2009/0327869 A1 * | 12/2009 | Fan | ......................... | G06Q 30/02 715/240 |
| 2013/0254652 A1 * | 9/2013 | Chinosornvatana | .. | G06F 40/103 715/234 |
| 2014/0189498 A1 * | 7/2014 | Liverant | ............... | G06F 40/143 715/234 |
| 2015/0095759 A1 * | 4/2015 | Olenick | .............. | G06F 16/2428 715/234 |

(Continued)

*Primary Examiner* — Lashonda T Jacobs
(74) *Attorney, Agent, or Firm* — Shook, Hardy & Bacon L.L.P.

(57) ABSTRACT

Isolating an iframe of a webpage. In one embodiment, a method may include targeting an iframe in a webpage for isolation, executing, in a server browser, iframe code, sending, from the remote isolation server to the local client, the webpage with the iframe code of the iframe replaced with isolation code, executing, in a client browser, webpage code and the isolation code, intercepting, in the client browser, webpage messages sent from the webpage code and intended to be delivered to the iframe, sending, to the remote isolation server, the intercepted webpage messages to be injected into the iframe code executing at the server browser, intercepting, at the server browser, iframe messages sent from the iframe code and intended to be delivered to the webpage, and sending, to the local client, the intercepted iframe messages to be injected into the webpage code executing at the client browser.

20 Claims, 4 Drawing Sheets

(56) References Cited

U.S. PATENT DOCUMENTS

| | | | |
|---|---|---|---|
| 2016/0203113 A1* | 7/2016 | Doherty | G06F 40/106 |
| | | | 715/240 |
| 2017/0318045 A1* | 11/2017 | Johns | H04L 63/1433 |
| 2018/0041530 A1* | 2/2018 | Tang | G06F 16/951 |
| 2018/0139180 A1* | 5/2018 | Napchi | G06F 21/554 |
| 2018/0338166 A1* | 11/2018 | Amiga | H04L 65/605 |
| 2019/0179879 A1 | 6/2019 | Amiga et al. | |
| 2019/0230090 A1* | 7/2019 | Kathiara | H04L 9/3242 |
| 2020/0104488 A1* | 4/2020 | Li | G06F 16/9566 |
| 2020/0151797 A1* | 5/2020 | Parhar | H04L 67/306 |
| 2021/0084038 A1* | 3/2021 | Feasel | H04L 63/0884 |

* cited by examiner

ISOLATING AN IFRAME OF A WEBPAGE

BACKGROUND

A webpage is a document written in a standard markup language that is typically downloaded to a local client over the World Wide Web of the Internet from a webserver. Once downloaded, the webpage is then rendered to a user of the local client in an application known as a web browser (or simply a "browser"). When a webpage that was downloaded from a webserver is rendered in a browser, the webpage may have sub-resources that are downloaded from other third-party webservers (such as ad network webservers, Content Distribution Network webservers, third party analytics webservers, etc.). Browsers may be configured to employ many different technologies and programming languages and may also be configured to execute executable code (that is downloaded as part of a webpage or from third-party webservers) during the rendering of the webpage. Allowing a browser to execute executable code that is included in a webpage (which may be a default setting in the browser) may add dynamic functionality to the webpage, thus making the webpage more useful to a user.

One potential problem with allowing a browser to execute executable code in a webpage while rendering the webpage is the potential for the executable code to be malicious. For example, a purveyor of a computer virus may embed the virus as malicious executable code in a webpage in an attempt to compromise a local client with the virus. In particular, once the webpage is downloaded to a browser at the local client and the malicious executable code is executed by the browser during the rendering of the webpage, the virus may compromise the local client. Therefore, although it may be useful to a user to allow a browser to execute executable code in a webpage while rendering the webpage, the potential for the executable code to be malicious may present a security threat to the local client on which the browser is executing.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for isolating an iframe of a webpage may be performed, at least in part, by a remote isolation server including one or more processors and by a local client including one or more processors. The method may include targeting, at the remote isolation server, the iframe in the webpage for isolation, the iframe having iframe code, the webpage having webpage code, executing, in a server browser at the remote isolation server, the iframe code, sending, from the remote isolation server to the local client, the webpage with the iframe code of the iframe replaced with isolation code, executing, in a client browser at the local client, the webpage code and the isolation code, intercepting, in the client browser at the local client, webpage messages sent from the webpage code and intended to be delivered to the iframe, sending, from the local client to the remote isolation server, the intercepted webpage messages to be injected into the iframe code executing at the server browser, intercepting, at the server browser at the remote isolation server, iframe messages sent from the iframe code and intended to be delivered to the webpage, and sending, from the remote isolation server to the local client, the intercepted iframe messages to be injected into the webpage code executing at the client browser.

In some embodiments, the targeting, at the remote isolation server, of the iframe in the webpage for isolation may be based on a policy under which the iframe is determined to be hosted on a website that has a risk level that is above a threshold risk level.

In some embodiments, at least a portion of the webpage code may be controlled by a first third-party while at least a portion of the iframe code is controlled by a second third-party.

In some embodiments, the webpage messages and/or the iframe messages may be sent by calling a window.postMessage( ) function in the webpage code and/or the iframe code.

In some embodiments, the webpage messages and/or the iframe messages may be sent by setting a window.name property in the webpage code and/or the iframe code.

In some embodiments, the isolation code may emulate functionality of the iframe code when the isolation code is executed in the client browser.

In some embodiments, the webpage may include a second iframe and the webpage code may be from the second iframe.

In some embodiments, one or more non-transitory computer-readable media may include one or more computer-readable instructions that, when executed by one or more processors of a remote isolation server and of a local client, cause the remote isolation server and the local client to perform a method for isolating an iframe of a webpage.

In some embodiments, a remote isolation server may include one or more processors and one or more non-transitory computer-readable media. The one or more non-transitory computer-readable media may include one or more computer-readable instructions that, when executed by the one or more processors, cause the remote isolation server to perform a method for isolating an iframe of a webpage.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
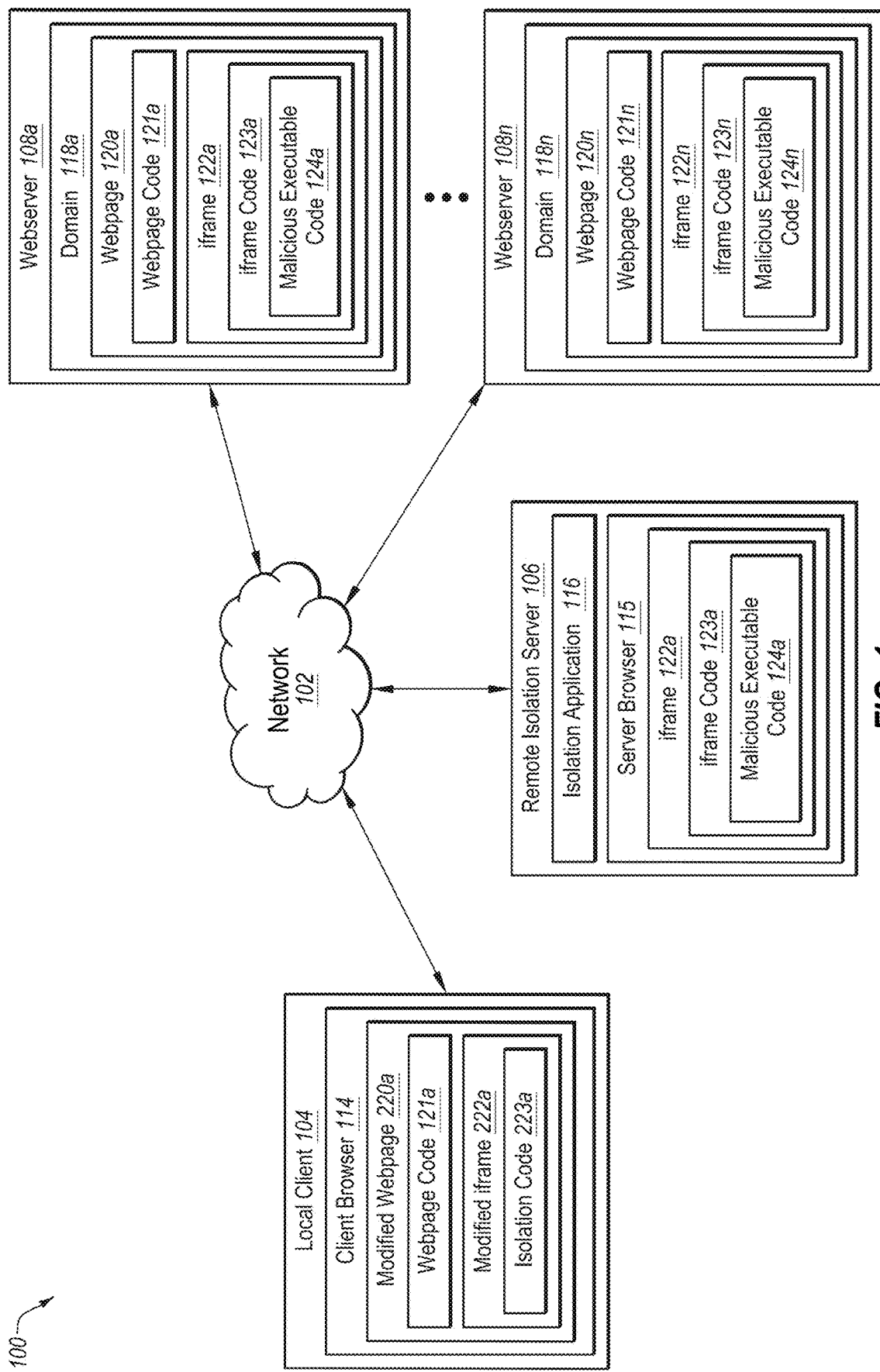
FIG. 1 illustrates an example system configured for isolating an iframe of a webpage.

Although allowing a browser to execute executable code that is included in a webpage may add dynamic functionality to the webpage, the potential for the executable code to be malicious may present a security threat to the local client on which the browser is executing. One solution for avoiding this security threat involves remote webpage browsing, also known as web isolation.

One difficulty with web isolation involves the modern reality that a single webpage may include content from many different webservers. For example, a major news organization's website (e.g., www.cnn.com) may include multiple iframes within the webpage which load content from multiple webservers. An iframe (also known as an inline frame) is a markup language (e.g., HTML) document embedded inside another markup language document on a webpage. The iframe element is often used to insert content from another source, such as an advertisement or web analytics tool, into a webpage. In some situations, the main webserver that hosts the majority of the content on a webpage (e.g., content from CNN provided on the website www.cnn.com) may be trusted and secure, but a suspicious iframe within the webpage may load content from a webserver that is less trusted and less secure (e.g., from an ad webserver). Where a less trusted and less secure webserver is providing content in an iframe of a generally trusted and secure webpage, a malicious actor may stage a "waterhole" attack using the iframe. A "waterhole" attack using an iframe can be very effective because the popularity of the webpage may lead to many infections in short timeframes.

Due to the fact that web isolation takes time and entails a cost, in the case of a "waterhole" attack it may be desirable to only perform web isolation on the suspicious iframe, and not on the rest of the webpage, to minimize the time and cost consumed in web isolation of the entire webpage. However, conventional web isolation may only be capable of being performed on an entire webpage, and not on only a portion of a webpage such as on a single iframe of a webpage. Further, even if web isolation was to be performed on only a portion of a webpage (e.g., on only a single iframe of the webpage), this web isolation may disrupt bi-directional communication that goes back and forth between the isolated iframe and other portions of the webpage (e.g., other iframes of the webpage). Since this bi-directional communication may be necessary for the webpage to function as intended, disrupting this bi-directional communication may cause the webpage to no longer function as intended, thereby breaking the webpage.

Some embodiments disclosed herein may enable isolating an iframe of a webpage. In particular, where a webpage includes an iframe and it is determined that it would be desirable to perform web isolation on the iframe without performing web isolation on the remainder of the webpage, some embodiments disclosed herein may enable an isolation application executing on a remote isolation server to target the iframe in the webpage for isolation. The isolation application may then execute, in a server browser at the remote isolation server, the iframe and its associated iframe code and send, from the remote isolation server to a local client, the webpage with the iframe code of the iframe replaced with isolation code (which emulates the useful functionality of the iframe code but without any malicious functionality). Then, a client browser at the local client may execute the remainder of the webpage (including any webpage code such as from other iframes of the webpage) and the isolation code. The isolation code may be configured to intercept, in the client browser at the local client, webpage messages sent from the webpage code and intended to be delivered to the iframe and send, from the local client to the remote isolation server, the intercepted webpage messages to be injected into the iframe code executing at the server browser. Simultaneously, the server browser may be configured to intercept iframe messages sent from the iframe code and intended to be delivered to the webpage and send, from the remote isolation server to the local client, the intercepted iframe messages to be injected into the webpage code executing at the client browser. In this manner, even though web isolation is performed on the iframe code of the iframe such that the iframe code is executed only at the remote isolation server and not at the local client (due to the possibility that the iframe code may include malicious executable content), any messages sent between the iframe code of the iframe and the webpage code of the webpage, and which are necessary for the webpage to function as intended, may continue to be received at their intended destinations and handled as intended. Thus, the intended functionality of the webpage may be preserved, and the extra time and cost of performing web isolation on the entire webpage (instead of just on the suspicious iframe) may be avoided. Further, any malicious executable content in the iframe code of the iframe may be safely handled on the remote isolation server, and may not be executed during the rendering of the webpage in the local browser on the local client, thus preventing any damage to the local client by the malicious executable content.

Turning to the figures, FIG. 1 illustrates an example system 100 configured for isolating an iframe of a webpage. The system 100 may include a network 102, a local client 104, a remote isolation server 106, and webservers 108a-108n.

In some embodiments, the network 102 may be configured to communicatively couple the local client 104, the remote isolation server 106, and the webservers 108a-108n to one another using one or more network protocols, such as the network protocols available in connection with the World Wide Web. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines and cell towers, for sending data in a variety of different communication protocols, such as a cellular network or a Voice over IP (VoIP) network.

Figure 3:
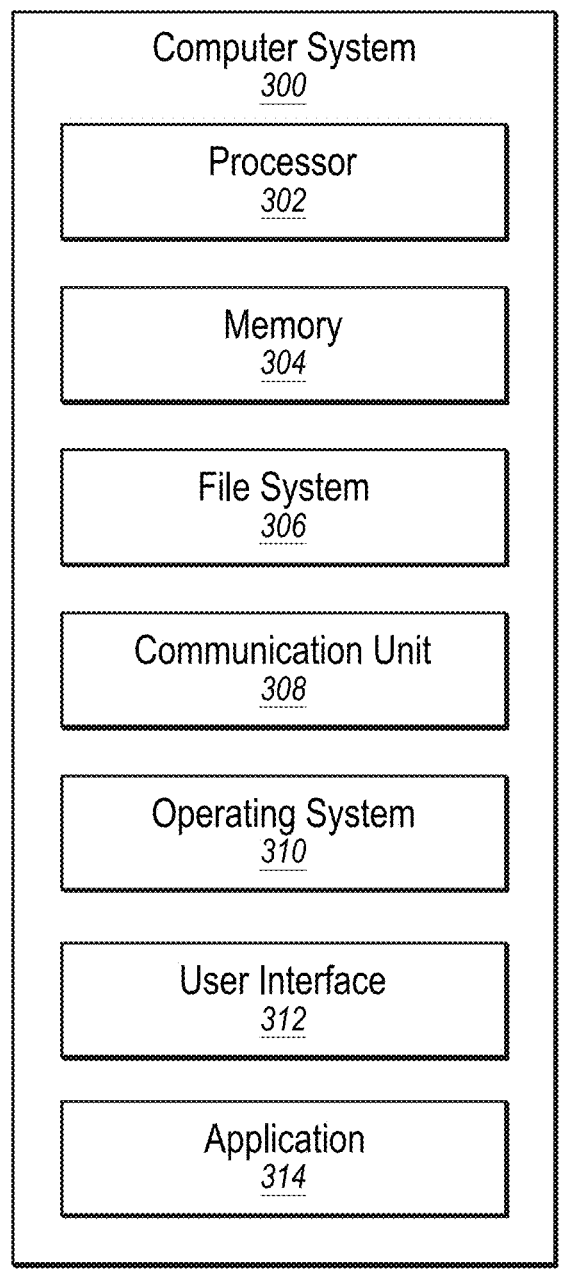
FIG. 3 illustrates an example computer system that may be employed in isolating an iframe of a webpage.

In some embodiments, the webservers 108a-108n may each be any computer system capable of communicating over the network 102 and capable of hosting webpages addressable at a particular web domain, examples of which are disclosed herein in connection with the computer system 300 of FIG. 3. The webservers 108a-108n may be addressable on domains 118a-118n and may host webpages 120a-120n, respectively. The webpages 120a-120n may include embedded executable content, such as webpage code 121a-121n (e.g., that may be included in one or more iframes of the webpages 120a-120n), as well as iframes 122a-122n that include embedded executable content, such as iframe code 123a-123n, which may include malicious executable code 124a-124n. Each of the malicious executable code 124a-124n may be, for example, an executable file or executable script in a scripting language such as VBScript, AngularJS, JQuery, Bootstrap, AJAX, JScript, and ActionScript. The malicious functionality of the malicious executable content may include, for example, functionality typical of a spyware, a virus, a worm, a logic bomb, a trapdoor, a Trojan horse, a Remote Admin Trojan (RAT), a malware, a mobile malicious code, a malicious font, and a rootkit, or some combination thereof.

In some embodiments, the local client 104 may be any computer system capable of communicating over the network 102 and executing a browser, examples of which are disclosed herein in connection with the computer system 300 of FIG. 3. The local client 104 may include a client browser 114. The client browser 114 may be configured to render webpages, such as the webpages 120a-120n, to a user of the local client 104.

In some embodiments, the remote isolation server 106 may be any computer system capable of communicating over the network 102 and capable of monitoring the local client 104 in order to protect the local client from webpages having malicious executable content, examples of which are disclosed herein in connection with the computer system 300 of FIG. 3. In some embodiments, the remote isolation server 106 may be employed by an organization that manages and/or protects the network 102 and/or the local client 104, and/or any of the webservers 108a-108n. In some embodiments, the remote isolation server 106 may include an isolation application 116. The isolation application 116 may be configured to secure the local client 104 from any malicious executable content found in a webpage, as disclosed in greater detail in connection with FIGS. 2A-2B herein.

In some embodiments, the isolation application 116 may function as a remote web isolation environment, where malicious executable content in webpage data can be safely transformed into a layout node tree that excludes the malicious executable content, thus protecting the local client 104 from ever being exposed to any such malicious executable content. In some embodiments, the isolation application 116 may include, or control, a server browser 115. The server browser 115 may be browser engine, such as a WebKit or Blink browser engine.

In some embodiments, when a webpage, such as the webpage 120a, is requested by the client browser 114 on the local client 104, the isolation application 116 on the remote isolation server 106 may intercept the request, or the response to the request, in order to securely prevent the webpage data of the webpage 120a from being sent directly from the webserver 108a to the client browser 114. After intercepting the request, or the response to the request, the isolation application 116 may receive webpage data corresponding to the webpage 120a from the webserver 108a. This webpage data may include, for example, one or more of Hypertext Markup Language (HTML) data, Cascading Style Sheet (CSS) data, Fonts data, JavaScript data, Scalable Vector Graphics (SVG) data, and Flash data, and data in any other browser rendering format.

In some embodiments, some portion of the received webpage data may include one or more iframes, such as the iframe 122a. The isolation application 116 may determine, according to an isolation policy, that the webpage data for the webpage 120a, such as the webpage code, is generally trusted and secure, but that the webpage data for the iframe 122a, such as the iframe code 123a (which includes the malicious executable code 124a) is less trusted and less secure, and thus needs to have web isolation performed thereon. One example method for performing web isolation in general, and which may be employed on the iframe 122a in the server browser 115 at the remote isolation server 106, is described in U.S. Patent Publication No. 2019/0179879 A1, which is incorporated herein by reference in its entirety. In these embodiments, the isolation application 116 may generate a modified version of the webpage 120a, namely modified webpage 220a, to send to the client browser 114. The modified webpage 220a may include the original webpage code 121a (e.g., which may be included in one or more non-suspicious iframes of the modified webpage 220a), but may include a modified iframe 222a which includes isolation code 223a instead of the original iframe code 123a. The isolation code 223a may be intended to emulate any safe functionality of the iframe code 123a, but without any malicious functionality, such as the malicious functionality of the malicious executable code 124a. At the same time, the server browser 115 may be configured to load the original iframe 122a and execute the original iframe code 123a.

Then, in order to properly emulate the original webpage 120a, the isolation code 223a and the server browser 115 may be configured to intercept and forward any messages sent between the iframe code 123a of the iframe 122a and the webpage code 121a of the modified webpage 220a, and which may be needed for the modified webpage 220a to function as intended. In particular, the isolation code 223a may be configured to intercept, in the client browser 114 at the local client 104, webpage messages sent from the webpage code 121a and intended to be delivered to the iframe 122a and send, from the local client 104 to the remote isolation server 106, the intercepted webpage messages to be injected into the iframe code 123a executing at the server browser 115. Simultaneously and synchronously, the server browser 115 may be configured to intercept iframe messages sent from the iframe code 123a and intended to be delivered to the webpage 120a and send, from the remote isolation server 106 to the local client 104, the intercepted iframe messages to be injected into the webpage code 121a executing at the client browser 114. In this manner, even though web isolation is performed on the iframe code 123a of the iframe 122a, such that the iframe code 123a is executed only at the remote isolation server 106 and not at the local client 104 (due to the possibility that the iframe code 123a may include the malicious executable code 124a), any messages sent between the iframe code 123a of the iframe 122a and the webpage code 121a of the modified webpage 220a, and which are necessary for the modified webpage 220a to function as intended, may continue to be received at their intended destinations and handled as intended. Thus, the intended functionality of the webpage 120a in the modified webpage 220a may be preserved, and the extra time and cost of performing web isolation on the entire webpage 120a (instead of just on the suspicious iframe 122a) may be avoided. Further, the malicious executable code 124a in the iframe code 123a of the iframe 122a is safely handled on the remote isolation server 106, and is not executed during the rendering of the modified webpage 220a in the client browser 114 on the local client 104, thus preventing any damage to the local client 104 by the malicious executable code 124a.

In some embodiments, the remote isolation server 106, and the isolation application 116 and the server browser 115 executing thereon, may include, or be part of, a network security device or application such as Symantec Corporation's ProxySG S200/S400/S500 appliance or virtual appliance or cloud service, Symantec Corporation's Secure Web Gateway (SWG), Symantec Corporation's Secure Web Gateway Virtual Appliance (SWG VA), Symantec Corporation's Advanced Secure Gateway (ASG) S200/S400/S500, or Symantec Corporation's Web Isolation.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2A:
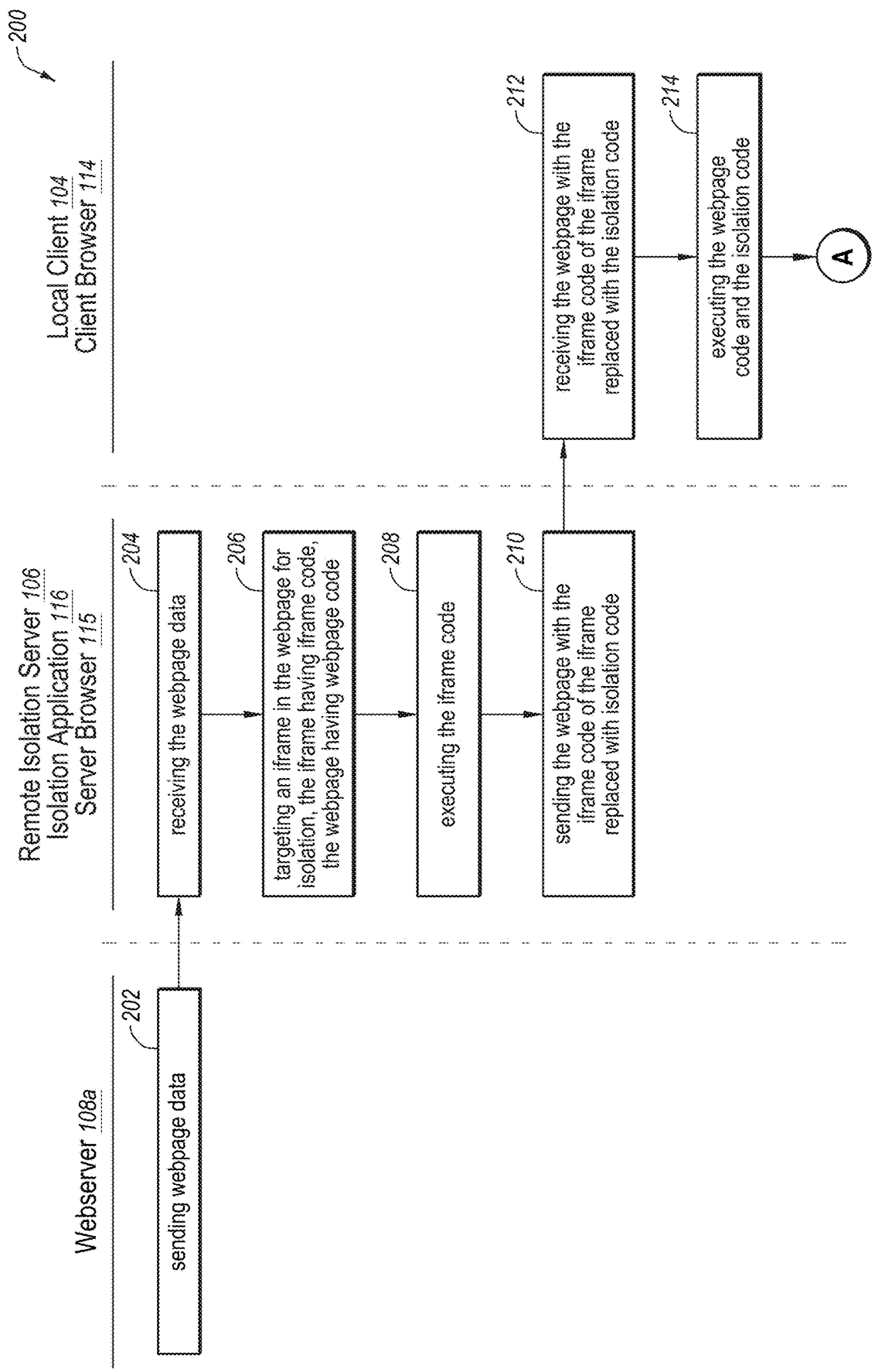
FIGS. 2A-2B are a flowchart of an example method for isolating an iframe of a webpage.
Figure 2B:
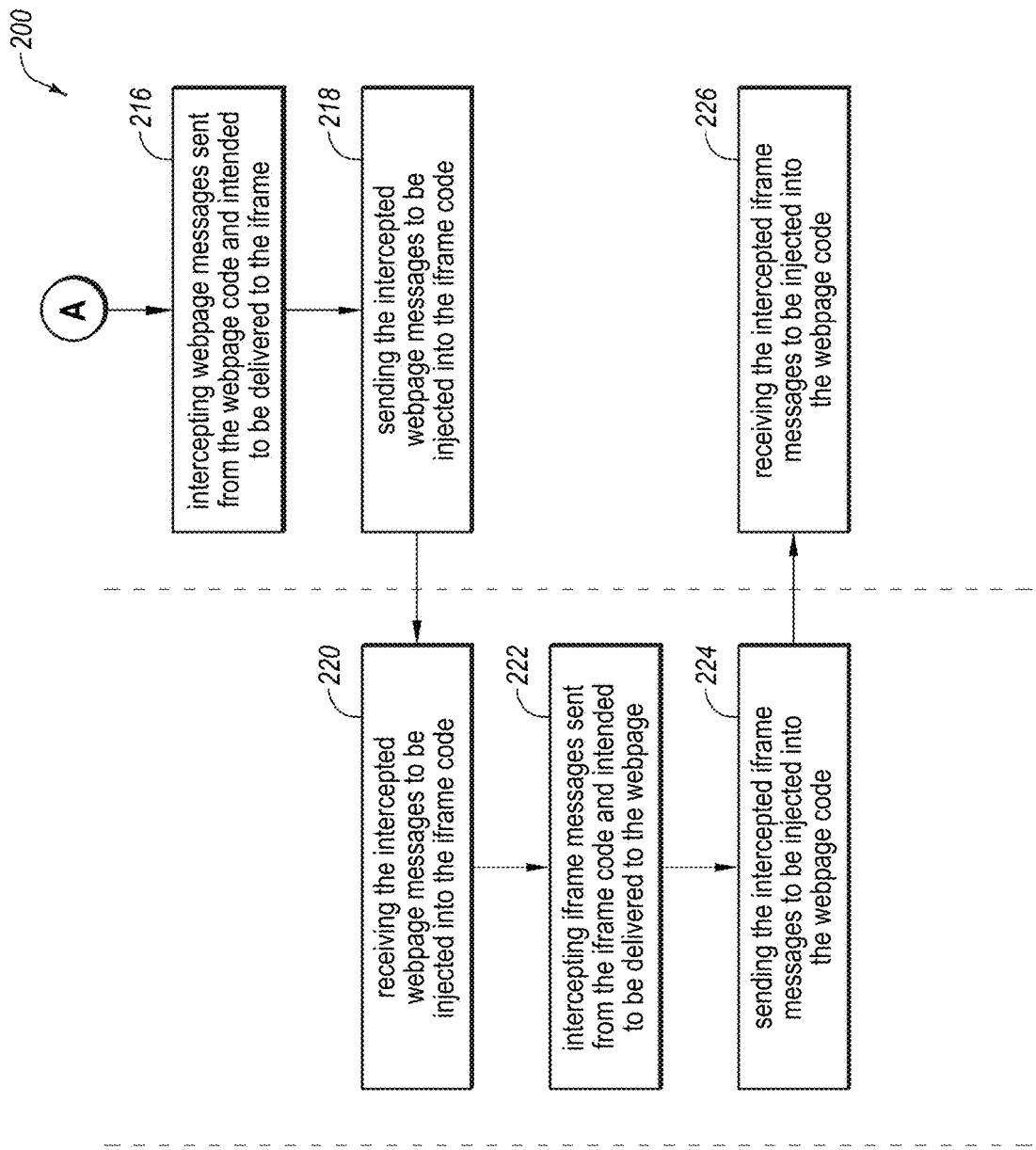

FIGS. 2A-2B are a flowchart of an example method 200 for isolating an iframe of a webpage. The method 200 may be performed, in some embodiments, by a device or system, such as by the webserver 108a, by the server browser 115 or the isolation application 116 on the remote isolation server 106, and/or by the client browser 114 on the local client 104. In these and other embodiments, the method 200 may be performed by one or more processors based on one or more computer-readable instructions stored on one or more non-transitory computer-readable media. The method 200 will now be described in connection with FIGS. 1 and 2A-2B.

In some embodiments, the initial actions of the method 200 (e.g., actions 202, 204, and/or 206) may be performed in response to a client browser, at a local client, requesting access to a webserver. For example, a user may type a URL into the client browser 114 on the local client 104, such as www.cnn.com. This URL may correspond to the domain 118a and the webpage 120a hosted at the webserver 108a. In response to the user typing this URL into the client browser 114, the client browser 114 may send a request to the webserver 108a for the webpage 120a at the domain 118a. This request, or the response to this request from the webserver 108a, may then be intercepted by the isolation application 116 in order to securely prevent the webserver 108a from sending webpage data corresponding to the webpage 120a directly to the client browser 114. This interception by the isolation application 116 may then result in the actions 202, 204, and/or 206.

The method 200 may include, at action 202, sending webpage data and, at action 204, receiving the webpage data. In some embodiments, the webpage data received from the webserver may include one or more of Hypertext Markup Language (HTML) data, Cascading Style Sheet (CSS) data, Fonts data, JavaScript data, Scalable Vector Graphics (SVG) data, Flash data, and data in any other browser rendering format. For example, the webserver 108a may send, at action 202, and the isolation application 116 may receive, at action 204, webpage data corresponding to the webpage 120a that is hosted at the domain 118a on the webserver 108a. The received webpage data may include, for example, HTML data, CSS data, Fonts data, JavaScript data, SVG data, Flash data, and data in any other browser rendering format, and some portion of the received webpage data may include the webpage code 121a and the iframe 122a, which includes the iframe code 123a, which includes the malicious executable code 124a.

The method 200 may include, at action 206, targeting an iframe in the webpage for isolation, the iframe having iframe code, the webpage having webpage code. In some embodiments, the targeting at action 206 may be based on a policy under which the iframe is determined to be hosted on a website that has a risk level that is above a threshold risk level. In some embodiments, at least a portion of the webpage code may be controlled by a first third-party while at least a portion of the iframe code is controlled by a second third-party. In some embodiments, the webpage may include a second iframe and the webpage code may be from the second iframe. For example, the isolation application 116 may target the iframe 122a in the webpage 120a for web isolation. In this example, the webpage code 121a of the webpage 120a may be controlled by a first third party (e.g., the webpage code 121a may be included in one or more iframes controlled by a major news website such as www.cnn.com), while the iframe code 123a may be controlled by a second third party (e.g., an ad website). This targeting may be performed in response to a policy under which the iframe 122a is determined to be hosted on a website (e.g., the ad website) that has a risk level that is above a threshold risk level, while the webpage code 121a is, under the same policy, determined to be hosted on a website (e.g., www.cnn.com) that has a risk level that is below the same threshold risk level. In this example, it is understood that the webpage code 121a may itself be part of a second iframe of the webpage 120a (or may itself be part of multiple iframes), and that these iframes may communicate with each other by sending messages to each other. Further, although the webpage 120a may include multiple iframes, fewer than all of the iframes may be targeted for isolation at action 206 due to fewer than all of the iframes presenting an unacceptable level of risk.

The method 200 may include, at action 208, executing the iframe code. For example, the isolation application 116 may execute, at action 208, the iframe code 123a in the server browser 115 by loading the iframe 122a into the server browser 115, in order to perform web isolation on the iframe code 123a. This may result in the malicious executable code 124a also being executed, due to the malicious executable code 124a being part of the iframe code 123a.

The method 200 may include, at action 210, sending and, at action 212, receiving the webpage with the iframe code of the iframe replaced with isolation code. In some embodiments, the isolation code may emulate functionality of the iframe code when the isolation code is executed in the client browser. For example, the isolation application 116 may send, at action 210, and the client browser 114 may receive, at action 212, the modified webpage 220a with the webpage code 121a intact but with the iframe code 123a of the modified iframe 222a replaced with isolation code 223a. When executed in the client browser 114, the isolation code 223a may emulate the functionality (e.g., visual functionality, or other non-visual functionality) of the iframe code 123a, but without any harmful functionality, such as the malicious functionality that is associated with execution of the malicious executable code 124a.

The method 200 may include, at action 214, executing the webpage code and the isolation code. For example, the client browser 114 may execute, at action 214, the webpage code 121a and the isolation code 223a.

The method 200 may include, at action 216, intercepting webpage messages sent from the webpage code and intended to be delivered to the iframe. For example, the client browser 114 may intercept, at action 216, webpage messages sent from the webpage code 121a and intended to be delivered to the iframe 122a.

The method 200 may include, at action 218, sending and, at action 220, receiving the intercepted webpage messages to be injected into the iframe code. For example, the client browser 114 may send, at action 218, and the isolation application 116 and/or the server browser 115 may receive, at action 220, the intercepted webpage messages, and may inject these webpage messages into the iframe code 123a which is being executed at the server browser 115.

The method 200 may include, at action 222, intercepting iframe messages sent from the iframe code and intended to be delivered to the webpage. For example, the isolation application 116 and/or the server browser 115 may intercept, at action 222, iframe messages sent from the iframe code 123a and intended to be delivered to the webpage 120a.

The method 200 may include, at action 224, sending and, at action 226, receiving the intercepted iframe messages to be injected into the webpage code. For example, the isolation application 116 and/or the server browser 115 send, at action 224, and the client browser 114 may receive, at action 226, the intercepted iframe messages, and may inject these iframe messages into the webpage code 121a which is being executed at the client browser 114.

In some embodiments, actions 222, 224, and 226 may be performed simultaneously and synchronously with actions 216, 218, and 220, such that communication of the iframe messages and the webpage messages are synchronized, by being intercepted and sent to be injected into the webpage code and the iframe code, respectively. Further, in some embodiments, the webpage messages and/or the iframe messages may be sent by calling a window.postMessage( ) function, and/or by setting a window.name property, in the webpage code and/or the iframe code.

The method 200 may thus be employed, in some embodiments, to render a modified version of the webpage 120a (e.g., the modified webpage 220a) in the client browser 114 that appears to a user to function similarly or identically to the original webpage 120a. In particular, even though the method 200 performs web isolation on the iframe code 123a of the iframe 122a, such that the iframe code 123a is executed only at the remote isolation server 106 and not at the local client 104 (due to the possibility that the iframe code 123a may include the malicious executable code 124a), any messages sent between the iframe code 123a of the iframe 122a and the webpage code 121a of the modified webpage 220a (e.g., by calling a window.postMessage( ) function, and/or by setting a window.name property), and which may be necessary for the modified webpage 220a to function as intended, may continue to be received at their intended destinations and handled as intended. Thus, the intended functionality of the webpage 120a in the modified webpage 220a may be preserved in the method 200. At the same time, the extra time and cost of performing web isolation on the entire webpage 120a (instead of just on the suspicious iframe 122a) may be avoided. Further, the malicious executable code 124a in the iframe code 123a of the iframe 122a may be safely handled on the remote isolation server 106 in the method 200, and may not be executed in the client browser 114 on the local client 104 during the rendering of the modified webpage 220a, thus preventing any damage to the local client 104 by the malicious executable code 124a.

Although the actions of the method 200 are illustrated in FIGS. 2A-2B as discrete actions, various actions may be divided into additional actions, combined into fewer actions, reordered, expanded, or eliminated, depending on the desired implementation. For example, in some embodiments, actions 216-226 may be performed separately from the other actions of the method 200. Also, in some embodiments, actions 208-226 may be performed separately from the other actions of the method 200. Also, in some embodiments, actions 206-226 may be performed separately from the other actions of the method 200.

Further, it is understood that the method 200 may improve the functioning of a computer system itself. For example, the functioning of local client 104 and/or the remote isolation server 106 of FIG. 1 may itself be improved by the method 200. For example, the local client 104 and/or the remote isolation server 106 may be improved by the method 200 isolating the iframe 122a of the webpage 120a, because this web isolation may allow the remote isolation server 106 to protect the local client 104 from the malicious executable content 124a by isolating only a portion of the webpage 120a (e.g., by only isolating the iframe 122a), without the time and cost consumed in web isolation of the entire webpage 120a (e.g., without isolating the webpage code 121a).

FIG. 3 illustrates an example computer system 300 that may be employed in isolating an iframe of a webpage. In some embodiments, the computer system 300 may be part of any of the systems or devices described in this disclosure. For example, the computer system 300 may be part of any of the local client 104, the remote isolation server 106, and the webservers 108a-108n of FIG. 1.

The computer system 300 may include a processor 302, a memory 304, a file system 306, a communication unit 308, an operating system 310, a user interface 312, and a module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, a network device, a network security appliance, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more of the actions of the method 200 of FIGS. 2A-2B.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more of the actions of the method 200 of FIGS. 2A-2B. These computer-executable instructions may be included, for example, in the operating system 310, in one or more applications, such as the client browser 114 or the isolation application 116 or the server browser 115 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The module 314 may be one or more computer-readable instructions stored on one or more non-transitory computer-readable media, such as the memory 304 or the file system 306, that, when executed by the processor 302, is configured to perform one or more of the actions of the method 200 of FIGS. 2A-2B. In some embodiments, the module 314 may be part of the operating system 310 or may be part of an application of the computer system 300, or may be some combination thereof. In some embodiments, the module 314 may function as any one of the client browser 114, the isolation application 116, and the server browser 115 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for isolating an iframe of a webpage, at least a portion of the method being performed by a remote isolation server comprising one or more processors and by a local client comprising one or more processors, the method comprising:
    targeting, at the remote isolation server, the iframe in the webpage for isolation, the iframe having iframe code, the webpage having webpage code;
    executing, in a server browser at the remote isolation server, the iframe code;
    sending, from the remote isolation server to the local client, the webpage with the iframe code of the iframe replaced with isolation code;
    executing, in a client browser at the local client, the webpage code and the isolation code; intercepting, in the client browser at the local client, webpage messages sent from the webpage code and intended to be delivered to the iframe;
    sending, from the local client to the remote isolation server, the intercepted webpage messages to be injected into the iframe code executing at the server browser;
    intercepting, at the server browser at the remote isolation server, iframe messages sent from the iframe code and intended to be delivered to the webpage; and
    sending, from the remote isolation server to the local client, the intercepted iframe messages to be injected into the webpage code executing at the client browser.

2. The method of claim 1, wherein the targeting, at the remote isolation server, of the iframe in the webpage for isolation is based on a policy under which the iframe is determined to be hosted on a website that has a risk level that is above a threshold risk level.

3. The method of claim 1, wherein at least a portion of the webpage code is controlled by a first third-party while at least a portion of the iframe code is controlled by a second third-party.

4. The method of claim 1, wherein the webpage messages and/or the iframe messages are sent by calling a window.postMessage( ) function in the webpage code and/or the iframe code.

5. The method of claim 1, wherein the webpage messages and/or the iframe messages are sent by setting a window.name property in the webpage code and/or the iframe code.

6. The method of claim 1, wherein the isolation code emulates functionality of the iframe code when the isolation code is executed in the client browser.

7. The method of claim 1, wherein the webpage includes a second iframe and the webpage code is from the second iframe.

8. One or more non-transitory computer-readable media comprising one or more computer-readable instructions that, when executed by one or more processors of a remote isolation server and of a local client, cause the remote isolation server and the local client to perform a method for isolating an iframe of a webpage, the method comprising:
    targeting, at the remote isolation server, the iframe in the webpage for isolation, the iframe having iframe code, the webpage having webpage code;
    executing, in a server browser at the remote isolation server, the iframe code;
    sending, from the remote isolation server to the local client, the webpage with the iframe code of the iframe replaced with isolation code;
    executing, in a client browser at the local client, the webpage code and the isolation code;
    intercepting, in the client browser at the local client, webpage messages sent from the webpage code and intended to be delivered to the iframe;
    sending, from the local client to the remote isolation server, the intercepted webpage messages to be injected into the iframe code executing at the server browser;
    intercepting, at the server browser at the remote isolation server, iframe messages sent from the iframe code and intended to be delivered to the webpage; and
    sending, from the remote isolation server to the local client, the intercepted iframe messages to be injected into the webpage code executing at the client browser.

9. The one or more non-transitory computer-readable media of claim 8, wherein the targeting, at the remote isolation server, of the iframe in the webpage for isolation is based on a policy under which the iframe is determined to be hosted on a website that has a risk level that is above a threshold risk level.

10. The one or more non-transitory computer-readable media of claim 8, wherein at least a portion of the webpage code is controlled by a first third-party while at least a portion of the iframe code is controlled by a second third-party.

11. The one or more non-transitory computer-readable media of claim 8, wherein the webpage messages and/or the iframe messages are sent by calling a window.postMessage( ) function in the webpage code and/or the iframe code.

12. The one or more non-transitory computer-readable media of claim 8, wherein the webpage messages and/or the iframe messages are sent by setting a window.name property in the webpage code and/or the iframe code.

13. The one or more non-transitory computer-readable media of claim 8, wherein the isolation code emulates functionality of the iframe code when the isolation code is executed in the client browser.

14. The one or more non-transitory computer-readable media of claim 8, wherein the webpage includes a second iframe and the webpage code is from the second iframe.

15. A remote isolation server comprising:
one or more processors; and
one or more non-transitory computer-readable media comprising one or more computer-readable instructions that, when executed by the one or more processors, cause the remote isolation server to perform a method for isolating an iframe of a webpage, the method comprising:
   targeting, at the remote isolation server, the iframe in the webpage for isolation, the iframe having iframe code, the webpage having webpage code;
   executing, in a server browser at the remote isolation server, the iframe code;
   sending, from the remote isolation server to a local client, the webpage with the iframe code of the iframe replaced with isolation code, for a client browser at the local client to execute the webpage code and the isolation code, for the client browser at the local client to intercept webpage messages sent from the webpage code and intended to be delivered to the iframe, and for the local client to send to the remote isolation server the intercepted webpage messages to be injected into the iframe code executing at the server browser;
   intercepting, at the server browser at the remote isolation server, iframe messages sent from the iframe code and intended to be delivered to the webpage; and
   sending, from the remote isolation server to the local client, the intercepted iframe messages to be injected into the webpage code executing at the client browser.

16. The remote isolation server of claim 15, wherein the targeting, at the remote isolation server, of the iframe in the webpage for isolation is based on a policy under which the iframe is determined to be hosted on a website that has a risk level that is above a threshold risk level.

17. The remote isolation server of claim 15, wherein at least a portion of the webpage code is controlled by a first third-party while at least a portion of the iframe code is controlled by a second third-party.

18. The remote isolation server of claim 15, wherein the webpage messages and/or the iframe messages are sent by calling a window.postMessage( ) function in the webpage code and/or the iframe code.

19. The remote isolation server of claim 15, wherein the webpage messages and/or the iframe messages are sent by setting a window.name property in the webpage code and/or the iframe code.

20. The remote isolation server of claim 15, wherein the isolation code emulates functionality of the iframe code when the isolation code is executed in the client browser.

* * * * *